United States Patent
Jungwirth et al.

(10) Patent No.: US 9,625,622 B2
(45) Date of Patent: Apr. 18, 2017

(54) ASPHERIC VARIABLE FOCAL LENGTH LENS SYSTEMS AND METHODS

(71) Applicant: Honeywell International Inc., Morristown, NJ (US)

(72) Inventors: Matthew E. L. Jungwirth, Golden Valley, MN (US); Matthew S. Marcus, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 103 days.

(21) Appl. No.: 14/524,563

(22) Filed: Oct. 27, 2014

(65) Prior Publication Data

US 2016/0116720 A1    Apr. 28, 2016

(51) Int. Cl.

| | | |
|---|---|---|
| *G02B 15/14* | (2006.01) | |
| *G02B 3/14* | (2006.01) | |
| *G02B 13/18* | (2006.01) | |
| *G02B 26/08* | (2006.01) | |
| *G02B 3/00* | (2006.01) | |

(52) U.S. Cl.
CPC ............. *G02B 3/14* (2013.01); *G02B 3/0081* (2013.01); *G02B 13/18* (2013.01); *G02B 26/0875* (2013.01)

(58) Field of Classification Search
CPC ....................................... G02B 15/00
USPC ........................................ 359/696
See application file for complete search history.

(56) References Cited

U.S. PATENT DOCUMENTS

| | | |
|---|---|---|
| 2007/0030573 A1 | 2/2007 | Batchko et al. |
| 2008/0144186 A1 | 6/2008 | Feng et al. |
| 2013/0176628 A1* | 7/2013 | Batchko ................... G02B 3/12 359/665 |

FOREIGN PATENT DOCUMENTS

JP    2000081504 A    3/2000

OTHER PUBLICATIONS

Extended Search Report from related European Patent Application No. 15191526, dated Apr. 1, 2016, 8 pp.

* cited by examiner

*Primary Examiner* — James Jones
(74) *Attorney, Agent, or Firm* — Brooks, Cameron & Huebsch, PLLC

(57) ABSTRACT

Aspheric variable focal length lens systems and methods are described herein. One example of a system for aspheric variable focal length lens includes a first surface coupled to a second surface by a number of concentric rings that creates a void, wherein the first surface is a variable aspheric surface, an optical material within the void between the first surface and the second surface, a first actuator located at a first end of the first surface and a first end of the second surface, and a second actuator located at a second end of the first surface and a second end of the second surface.

20 Claims, 3 Drawing Sheets

ASPHERIC VARIABLE FOCAL LENGTH LENS SYSTEMS AND METHODS

TECHNICAL FIELD

The present disclosure relates to aspheric variable focal length lens systems and methods.

BACKGROUND

A zoom lens is an optical imaging system that changes its magnification or focal length while keeping the relative location of the image plane stationary. A mechanical zoom lens can have a number of optical elements (e.g., lenses) and use cams or gears to adjust the spacing between the number of elements to vary the optical magnification. Adjusting the spacing between the number of elements can require sub-millimeter precision that has the potential of malfunctioning.

DETAILED DESCRIPTION

Figure 1:
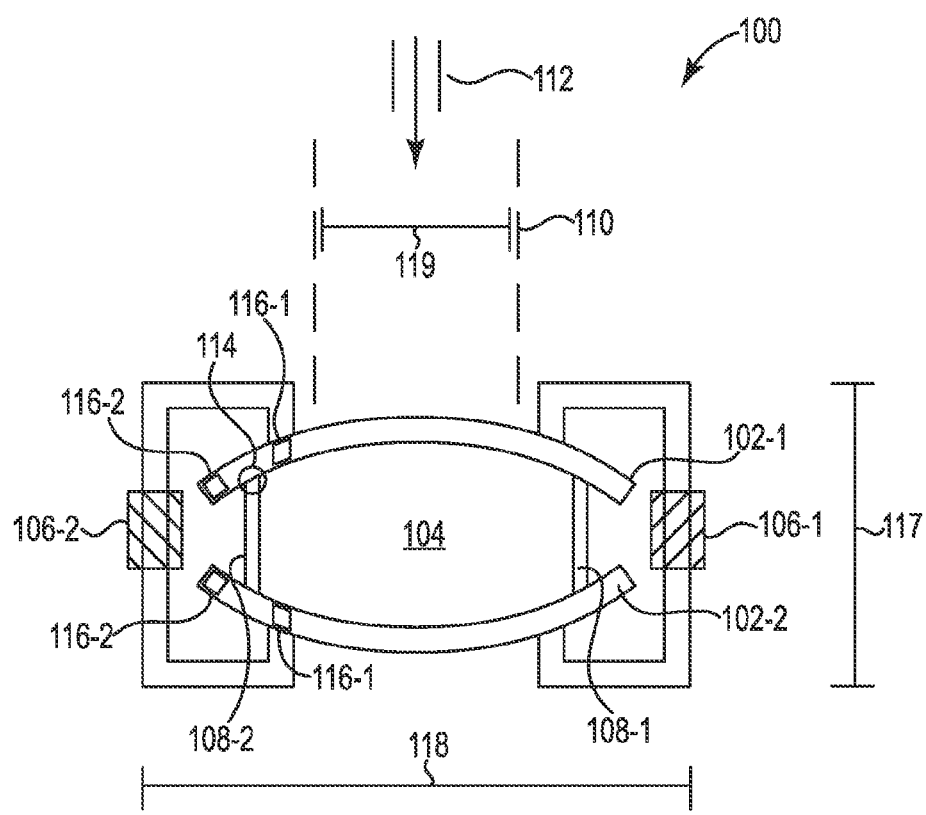
FIG. 1 illustrates an example of an aspheric variable focal length lens system in accordance with one or more embodiments of the present disclosure.

Aspheric variable focal length lens systems and methods are described herein. One example of a system for aspheric variable focal length lens includes a first surface coupled to a second surface by a number of concentric rings that creates a void, wherein the first surface is a variable aspheric surface, an optical material within the void between the first surface and the second surface, a first actuator located at a first end of the first surface and a first end of the second surface, and a second actuator located at a second end of the first surface and a second end of the second surface.

An aspheric variable focal length lens system can include an optical material (e.g., liquid optical material, polymer optical material, etc.) that is encased by a number of surfaces (e.g., variable surface, parabolic surface, flexible plastic material, flexible glass material, poly(methyl methacrylate) (PMMA) material, glass, etc.) and a number of concentric rings (e.g., a ring shaped material that are concentric) attached to the number of variable surfaces. In some embodiments, the aspheric variable length lens can include a first surface that is a variable transparent surface (e.g., parabolic surface, flexible plastic material, flexible glass material, poly(methyl methacrylate) (PMMA) material) and a second surface that is not a non-variable transparent surface (e.g., glass material, non-flexible plastic material, etc.). In some embodiments, the optical material can be encased by a four sided void. In some embodiments, the four sided void can comprise two variable surfaces for two of the four sides and two concentric rings for the remaining two of the four sides. The variable surfaces can be attached to the concentric rings to form a void that is capable of sealing in a liquid optical material.

The aspheric variable focal length lens system can also include a number of actuators (e.g., device to apply pressure, mechanical device to apply pressure, etc.) to apply pressure on the number of variable surfaces. In some embodiments, the number of actuators can apply pressure to a portion of the variable surfaces that encase the optical material. The pressure applied to the variable surfaces can change a focal length of the aspheric lens comprising the variable surfaces, the concentric rings, and the optical material. Thus, the aspheric lens as described herein can be used for focusing and magnifying objects by applying different pressure to the aspheric lens utilizing the actuators. The aspheric lens, as described herein, can be beneficial over previous lens systems by providing focusing and/or zooming properties with a single aspheric lens.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of variable surfaces" can refer to one or more variable surfaces.

FIG. 1 illustrates an example of an aspheric variable focal length lens system 100 in accordance with one or more embodiments of the present disclosure. The aspheric variable focal length lens system 100 can include a first surface 102-1 and a second surface 102-2 that are coupled to each other by a first concentric ring 108-1 and a second concentric ring 108-2. In some embodiments, at least one of the first surface 102-1 and the second surface 102-2 include a variable surface (e.g., flexible surface) as described herein.

In some embodiments, the first surface 102-1 and the second surface 102-2 can comprise a flexible or a non-flexible transparent material. In some embodiments, a non-flexible transparent material can comprise a static material that is not flexible. In some embodiments, the flexible transparent material can be a flexible plastic material such as PMMA. In some embodiments, the flexible transparent material can be a relatively flexible glass material. In some embodiments, the first surface 102-1 and the second surface 102-2 can each comprise a single variable surface. In other embodiments, the first surface 102-1 and/or the second surface 102-2 can comprise a plurality of materials that can be utilized as the first surface 102-1 and/or second surface 102-2.

The first surface 102-1 and the second surface 102-2 can be attached to a first concentric ring 108-1 and a second concentric ring 108-2 to form an aspheric surface from the first surface 102-1 and the second surface 102-2. In some embodiments, the aspheric surface can be a parabolic surface that is formed by attaching the first surface 102-1 and the second surface 102-2 to the first concentric ring 108-1 and the second concentric ring 108-2. In some embodiments, the first concentric ring 108-1 and the second concentric ring 108-2 can each include a single concentric ring. In other embodiments, the first concentric ring 108-1 and/or the second concentric ring 108-2 can each comprise a plurality of concentric rings.

The first concentric ring 108-1 and the second concentric ring 108-2 can comprise a relatively non-flexible material in the shape of a ring or other shape that can be attached to the first surface 102-1 and the second surface 102-2. The relatively non-flexible material can include a metallic material such as aluminum (Al), a glass material, and/or a plastic material that is relatively non-flexible. The size of the first concentric ring 108-1 and the second concentric ring 108-2 can be changed to produce different shapes of the first surface 102-1 and the second surface 102-2, as well as the void that is formed. The size of the first concentric ring 108-1 and the second concentric ring 108-2 can be utilized to obtain a particular focal length of the aspheric lens. In addition, the size of the first concentric ring 108-1 and the second concentric ring 108-2 can be utilized to obtain a particular range of focal lengths. That is, the size of the first concentric ring 108-1 and the second concentric ring 108-2 can be altered to provide a particular minimum focal length and maximum focal length when the focal length of the aspheric lens is altered utilizing the first actuator 106-1 and the second actuator 106-2.

The non-flexible material can be utilized to remain stationary (e.g., keep the same and/or similar shape) when pressure from a first actuator 106-1 and/or a second actuator 106-2. That is, the first actuator 106-1 and/or the second actuator 106-2 can apply pressure to the first surface 102-1 and the second surface 102-2 to alter a position and/or shape of the first surface 102-1 and the second surface 102-2 without altering a position and/or shape of the first concentric ring 108-1 and the second concentric ring 108-2. Altering the position and/or shape of the first surface 102-1 and the second surface 102-2 can alter a focal length of the aspheric lens.

As described herein, the first surface 102-1, the second surface 102-2, the first concentric ring 108-1, and the second concentric ring 108-2 can form a sealed void that can be filled with an optical material 104. The optical material 104 can be a liquid optical material and/or a polymer optical material. The optical material 104 can be an optically transmissive material. The sealed void can be formed by binding the first concentric 108-1 and the second concentric ring 108-2 to the first surface 102-1 and the second surface 102-2 as displayed in FIG. 1. For example, the second concentric ring 108-2 can include a physical binding material 114 that binds the second concentric ring 108-2 to the first surface 102-1.

The physical binding material 114 can include a variety of materials that can form a bond that can seal the void as described herein. The variety of materials can be dependent on the type of materials utilized for the first surface 102-1 and the type of materials utilized for the second concentric ring 108-2. For example, the binding material 114 can be an adhesive material that can bind the specific types of materials utilized for the first surface 102-1 and the specific types of materials utilized for the second concentric ring 108-2.

The first actuator 106-1 and the second actuator 106-2 can be devices utilized to apply pressure to particular positions of the first surface 102-1 and the second surface 102-2. In some embodiments, the first actuator 106-1 and the second actuator 106-2 can comprise an actuating device that can be coupled to a number of brackets. In these embodiments, the number of brackets can apply pressure to the particular positions and the actuating device can alter the pressure applied to the particular positions.

In some embodiments, the first actuator 106-1 and the second actuator 106-2 can be positioned to apply pressure on the first surface 102-1 and the second surface 102-2 at a position that applies pressure to the optical material 104. For example, the second actuator 106-2 can be positioned to apply pressure near position 116-1, thus applying pressure on the optical material 104. In this example, the first actuator 106-1 can be placed in a corresponding position on an opposite position from the second actuator 106-2.

In some embodiments, the first actuator 106-1 and the second actuator 106-2 can be positioned to apply pressure on the first surface 102-1 and the second surface 102-2 at a position that applies pressure to an exterior portion of the first surface 102-1 and the second surface 102-2. For example, the second actuator 106-2 can be positioned to apply pressure near position 116-2, thus applying pressure to an exterior portion of the first surface 102-1 and the second surface 102-2. In this example, the first actuator 106-1 can be placed in a corresponding position on an opposite position from the second actuator 106-2. Placing the first actuator 106-1 and the second actuator 106-2 at or near positions 116-1 and 116-2 can alter the shape and/or focal length of the aspheric lens differently with an increase and/or decrease in pressure applied from the first actuator 106-1 and the second actuator 106-2.

In some embodiments, the first actuator 106-1 and the second actuator 106-2 can apply pressure to a first position of the first surface 102-1 and apply pressure to a second position of the second surface 102-2. In certain embodiments, pressure can be applied to a position on the first surface 102-1 that is on the void filled with the optical material 104 and applied to a position on the second surface 102-2 that is outside of the void filled with the optical material 104. For example, the first actuator 106-1 and the second actuator 106-2 can be positioned to apply pressure on the first surface 102-1 at or near position 116-1 and can also be positioned to apply pressure on the second surface 102-2 at or near position 116-2. This example can also be altered so that the first actuator 106-1 and the second actuator 106-2 are positioned to apply pressure on the first surface 102-1 at or near position 116-2 and can also be positioned to apply pressure on the second surface 102-2 at or near position 116-1.

The first actuator 106-1 and the second actuator 106-2 can be positioned as described herein to also provide an aperture 110. The aperture 110 can allow light 112 to pass past the first actuator 106-1 and the second actuator 106-2 and through the aspheric lens comprising the first material 102-1, the second material 102-2, and the optical material 104. The light 112 can pass through the aspheric lens and be directed based on a particular focal length of the aspheric lens. As described herein, the focal length of the aspheric lens can be altered by increasing and/or decreasing pressure that is applied to the aspheric lens from the first actuator 106-1 and the second actuator 106-2.

The size of the aspheric focal length lens system 100 can be different for particular embodiments. That is, in some embodiments, the aspheric focal length lens system 100 can be larger or smaller in size based on implementation. In some embodiments, the system 100 can have a length 117 of approximately 25 millimeters (mm). The length 117 can include the length of the first material 102-1, the second material 102-2, the optical material 104, and the first actuator 106-1/second actuator 106-2. In some embodiments, the system 100 can have a width 118 of approximately 30 mm. In some embodiments, the aperture 110 can have a length 119 of approximately 12 mm. As used herein, the term "approximately" is utilized to include a 1-5 mm increase and/or a 1-5 mm decrease in length. The size of the system 100 can be increased and/or decreased for various applications. In some embodiments, the size of the system 100 can be increased and/or decreased in a proportion to the measurements used herein.

The aspheric variable focal length lens system 100 can be utilized alter a focal length of an aspheric lens and/or parabolic lens as described herein. Altering the focal length of the aspheric lens can provide focusing and/or zooming capabilities of a single lens system (e.g., autofocus system). In some embodiments, the aspheric variable focal length lens system 100 can be utilized with a number of other lens systems and/or other aspheric variable focal length lens systems as described herein to create an adaptive optical zoom system.

Figure 2:
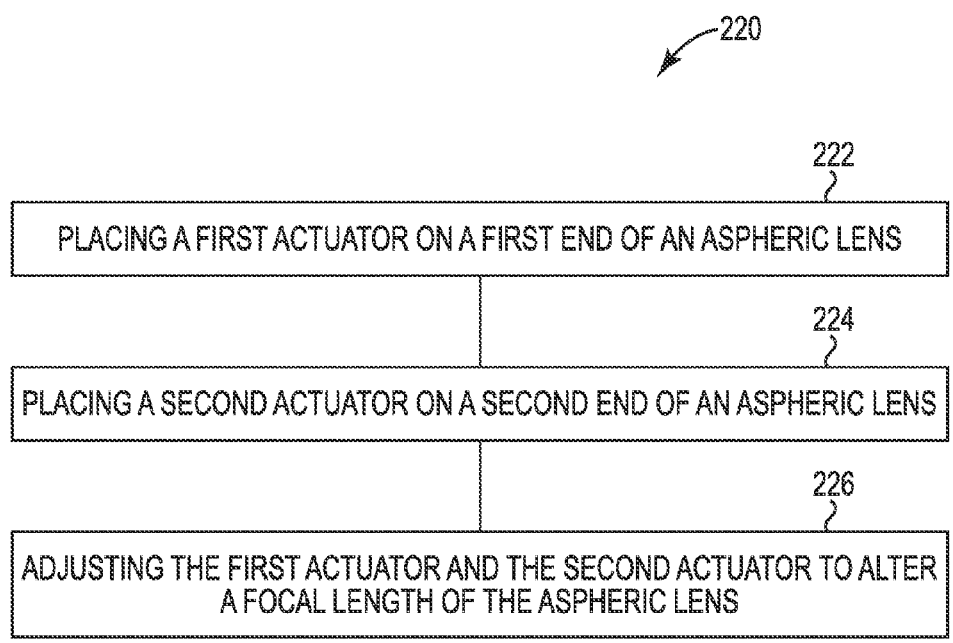
FIG. 2 illustrates an example method for an aspheric variable focal length lens in accordance with one or more embodiments of the present disclosure.

FIG. 2 illustrates an example method 220 for an aspheric variable focal length lens in accordance with one or more embodiments of the present disclosure. The method 220 can be utilized to alter a focal length of an aspheric variable focal length lens system 100 as referenced in FIG. 1. The method 220 can be utilized to alter a focal length of an aspheric lens in order to increase a size of an image and/or focus on an image.

At box 222, the method 220 can include placing a first actuator on a first end of an aspheric lens. Placing a first actuator on a first end of an aspheric lens can include placing an actuator (e.g., actuator 106-1, actuator 106-2, as referenced in FIG. 1, etc.) on a variable surface (e.g., surface 102-1, surface 102-2, as referenced in FIG. 1, etc.) of an aspheric lens.

In some embodiments, placing the first and second actuators can include placing the first and second actuators between a first concentric ring and a second concentric ring. As described herein, the first actuator can be placed at a position that is over a void that is formed in the aspheric lens by a number of variable surfaces and a number of concentric rings. As described herein, the void can be filled with an optical material. In addition, the first actuator can be placed at a position that is outside the void that is formed in the aspheric lens. That is, placing the first and second actuators can include placing the first and second actuators outside of a first concentric ring and a second concentric ring respectively.

At box 224, the method 220 can include placing a second actuator on a second end of the aspheric lens. Placing the second actuator on the second end of the aspheric lens can be similar and/or the same procedure for placing the first actuator on the first end of the aspheric lens as described herein.

At box 226, the method 220 can include adjusting the first actuator and the second actuator to alter a focal length of the aspheric lens. In some embodiments, adjusting the first actuator and the second actuator can include increasing and/or decreasing pressure applied to the aspheric lens. Adjusting the first actuator and the second actuator can include simultaneously adjusting the first actuator and the second actuator. That is, the same amount of pressure can be applied to the aspheric lens at the same and/or similar time. Adjusting the first actuator and the second actuator can be performed via a computing device as referenced in FIG. 3. The computing device can be coupled to the first and second actuator to control the first and second actuator to provide precise pressure from both of the first and second actuator.

Figure 3:
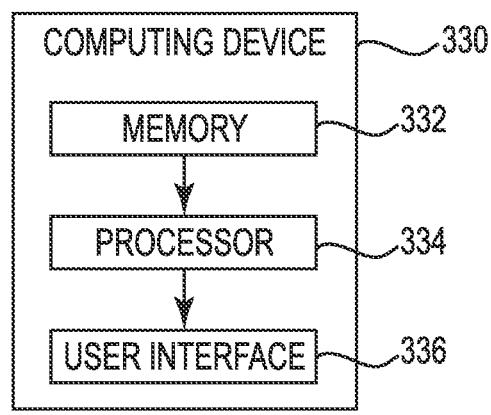
FIG. 3 illustrates a block diagram of an example of a computing device in accordance with one or more embodiments of the present disclosure.

FIG. 3 illustrates a block diagram of an example of a computing device 330 in accordance with one or more embodiments of the present disclosure. Computing device 330 can be, for example, a laptop computer, a desktop computer, a microprocessor, or a mobile device (e.g., a mobile phone, a personal digital assistant, etc.), among other types of computing devices.

As shown in FIG. 3, computing device 330 includes a memory 332 and a processor 334 coupled to memory 332. Memory 332 can be any type of storage medium that can be accessed by processor 334 to perform various examples of the present disclosure. For example, memory 332 can be a non-transitory computer readable medium having computer readable instructions (e.g., computer program instructions) stored thereon that are executable by processor 334 to determine a deployment of an access control system in accordance with one or more embodiments of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 332 can also be located internal to another computing resource (e.g., enabling computer readable instructions to be downloaded over the Internet or another wired or wireless connection).

As shown in FIG. 3, computing device 330 can also include a user interface 336. User interface 336 can include, for example, a display (e.g., a screen). The display can be, for instance, a touch-screen (e.g., the display can include touch-screen capabilities). User interface 336 (e.g., the display of user interface 336) can provide (e.g., display and/or present) information to a user of computing device 330.

Additionally, computing device 330 can receive information from the user of computing device 330 through an interaction with the user via user interface 336. For example, computing device 330 (e.g., the display of user interface 336) can receive input from the user via user interface 336. The user can enter the input into computing device 330 using, for instance, a mouse and/or keyboard associated with computing device 330, or by touching the display of user interface 336 in embodiments in which the display includes touch-screen capabilities (e.g., embodiments in which the display is a touch screen).

As described herein, a "module" can include computer readable instructions that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system, comprising:
   a first surface coupled to a second surface by a number of concentric rings that creates a sealed void between the first surface, the second surface, and the number of concentric rings, wherein the first surface is a variable aspheric surface formed by the number of concentric rings;
   a fixed quantity of an optical material sealed within the sealed void between the first surface and the second surface;
   a first actuator located at a first end of the first surface and a first end of the second surface; and
   a second actuator located at a second end of the first surface and a second end of the second surface.

2. The system of claim 1, comprising an aperture between the first actuator and the second actuator.

3. The system of claim 1, wherein the sealed void is a sealed area between the first surface, the second surface, and the number of concentric rings.

4. The system of claim 3, wherein the sealed area is filled with the optical material.

5. The system of claim 1, wherein the first actuator and the second actuator change a focal length of the system.

6. The system of claim 1, wherein each of the number of concentric rings are bound to an interior surface of the first surface and an interior surface of the second surface.

7. The system of claim 1, wherein the first surface, the second surface and the optical material create a parabolic lens surface.

8. A method for an aspheric variable focal length lens, comprising:
   generating an aspheric lens by coupling a first surface to a second surface with a first concentric ring and a second concentric ring to create a sealed void between the first surface, the second surface, the first concentric ring and the second concentric ring, wherein the first surface is a variable aspheric surface formed by the first concentric ring and the second concentric ring;
   placing a first actuator on a first end of the aspheric lens formed by, the first concentric ring, the second concentric ring, and a fixed quantity of optical material sealed within a sealed void;
   placing a second actuator on a second end of the aspheric lens; and
   adjusting the first actuator and the second actuator to alter a focal length of the aspheric lens.

9. The method of claim 8, wherein placing the first and second actuators includes placing the first and second actuators between the first concentric ring and the second concentric ring.

10. The method of claim 8, wherein placing the first and second actuators includes placing the first and second actuators outside of the first concentric ring and the second concentric ring.

11. The method of claim 8, wherein adjusting the first actuator and the second actuator includes increasing or decreasing pressure applied to the aspheric lens.

12. An aspheric variable focal length lens, comprising:
   a first variable surface coupled to a second variable surface by a first concentric ring attached to a first side of the first variable surface and a first side of the second variable surface and by a second concentric ring attached to a second side of the first variable surface and a second side of the second variable surface;
   a fixed quantity of an optical material sealed within a sealed void between the first variable surface, the second variable surface, the first concentric ring, and the second concentric ring, wherein the first surface is a variable aspheric surface formed by the first concentric ring and the second concentric ring;
   a first actuator located at the first side of the first variable surface and the first side of the second variable surface; and
   a second actuator located at the second side of the first variable surface and the second side of the second variable surface.

13. The aspheric variable focal length lens of claim 12, wherein the first variable surface and the second variable surface comprise a poly(methyl methacrylate) (PMMA) material.

14. The aspheric variable focal length lens of claim 12, wherein the first actuator and the second actuator are separated by a clear aperture to allow incident light to pass through the first variable surface, the second variable surface, and the optical material within the sealed void.

15. The aspheric variable focal length lens of claim 12, wherein the first variable surface and the second variable surface provide a parabolic surface.

16. The aspheric variable focal length lens of claim 12, wherein at least one of the first surface and the second surface comprise a static surface.

17. The aspheric variable focal length lens of claim 12, wherein the first actuator and the second actuator are synchronized and separate actuators.

18. The aspheric variable focal length lens of claim 12, wherein the first actuator and the second actuator are placed on the first variable surface and on the second variable surface that produce the sealed void.

19. The aspheric variable focal length lens of claim 12, wherein the first actuator and the second actuator are placed on the first variable surface and on the second variable surface that do not produce the sealed void.

20. The aspheric variable focal length lens of claim 12, wherein the sealed void is a sealed area capable of encasing a liquid optical material.

* * * * *